(12) United States Patent
Mutz et al.

(10) Patent No.: US 8,155,459 B2
(45) Date of Patent: Apr. 10, 2012

(54) VIDEO PROCESSING DEVICE WITH LOW MEMORY BANDWIDTH REQUIREMENTS

(75) Inventors: Stéphane Mutz, Caen (FR); Hugues De Perthuis, Garcelles (FR); Eric Desmicht, Caen (FR)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1689 days.

(21) Appl. No.: 10/556,616

(22) PCT Filed: May 6, 2004

(86) PCT No.: PCT/IB2004/001608
§ 371 (c)(1),
(2), (4) Date: Nov. 15, 2005

(87) PCT Pub. No.: WO2004/102971
PCT Pub. Date: Nov. 25, 2004

(65) Prior Publication Data
US 2007/0086522 A1    Apr. 19, 2007

(30) Foreign Application Priority Data

May 19, 2003    (EP) ..................... 03300015

(51) Int. Cl.
*G06K 9/36* (2006.01)
*H04N 7/12* (2006.01)
(52) U.S. Cl. ............... 382/236; 382/232; 375/240.12
(58) Field of Classification Search .......... 382/232–252; 375/240.02–240.29
See application file for complete search history.

(56) References Cited

U.S. PATENT DOCUMENTS

| 5,444,489 | A | 8/1995 | Truong et al. |
| 5,638,531 | A | 6/1997 | Crump et al. |
| 5,754,234 | A | 5/1998 | Kitsuki et al. |
| 6,052,149 | A | 4/2000 | Barnaby |
| 6,122,442 | A | 9/2000 | Purcell |

(Continued)

FOREIGN PATENT DOCUMENTS
DE    19735981    3/1998
(Continued)

OTHER PUBLICATIONS

Documents from counterpart PCT application No. PCT/IB2004/001608 (WO2004/102971), including International Search report dated Sep. 29, 2004, Written Opinion dated Nov. 19, 2005, and International Preliminary Report on Patentability dated Nov. 25, 2005.

(Continued)

*Primary Examiner* — Duy M Dang
(74) *Attorney, Agent, or Firm* — DLA Piper LLP (US)

(57) ABSTRACT

The present invention relates to a video processing device for processing data corresponding to a sequence of pictures according to a predictive block-based encoding technique. Said device comprises a processing unit (20) including a reconstruction circuit (16) for reconstructing pictures from decoded data and an external memory (1) for storing reference pictures delivered by the reconstruction circuit. The processing unit further comprises a memory controller (11) for controlling data exchange between the processing unit and the external memory, a cache memory (17) for temporarily storing data corresponding to a prediction area, said data being read out from the external memory via the memory controller, and a motion compensation circuit (14) for delivering motion compensated data to the reconstruction circuit on the basis of the prediction area read out from the cache memory.

14 Claims, 2 Drawing Sheets

U.S. PATENT DOCUMENTS

| | | | |
|---|---|---|---|
| 6,163,576 | A | 12/2000 | Lempel |
| 6,178,203 | B1 | 1/2001 | Lempel |
| 6,320,908 | B1 * | 11/2001 | Ikekawa .................. 375/240.25 |
| 6,425,054 | B1 | 7/2002 | Nguyen |
| 2003/0014596 | A1 | 1/2003 | Irie |

FOREIGN PATENT DOCUMENTS

| | | |
|---|---|---|
| EP | 0602642 | 12/1993 |
| EP | 0639032 | 7/1994 |
| EP | 0750429 | 5/1996 |
| EP | 0971546 | 4/1999 |
| FR | 2761499 | 10/1998 |
| FR | 2820846 | 8/2002 |
| JP | 63070386 | 3/1988 |
| JP | 6189298 A | 7/1994 |
| WO | WO 94/18796 | 8/1994 |
| WO | WO 02/065299 | 8/2002 |

OTHER PUBLICATIONS

Ely, S. R.: "MPEG Video Encoding: A Basic Tutorial Introduction", BBC Research and Development Report, Mar. 1996, 12 pages.

Furht, Broko, editor-in-chief: "Processor Architecture for Multimedia", Handbook of Multimedia Computing, CRC Press, Sep. 1998, pp. 452-465.

Radeon 7500 First Looks, ATI, Internet Publication, Aug. 2001, 4 pages.

* cited by examiner

US 8,155,459 B2

VIDEO PROCESSING DEVICE WITH LOW MEMORY BANDWIDTH REQUIREMENTS

This is a 371 application with benefit/priority of PCT/IB2004/001608, filed May 6, 2004, and claims benefit/priority of EP priority application No. 03300015.9, filed May 19, 2003.

FIELD OF THE INVENTION

The present invention relates to a video processing device for processing data corresponding to a sequence of pictures according to a predictive block-based encoding technique.

This invention is particularly relevant to video encoder, decoder and transcoder based on MPEG or an equivalent video standard.

BACKGROUND OF THE INVENTION

Video decoders or encoders based on predictive block-based encoding techniques, such as MPEG-2 or H.264, for example, are based on a recursive use of motion estimation/compensation in order to reduce the amount of information to be transmitted.

FIG. 1 shows a conventional video decoder according to these encoding techniques. Such a conventional video decoder is described for example in "MPEG video encoding: a basic tutorial introduction", BBC Research and Development Report, by S. R. Ely 1996/3.

Said video decoder (100) comprises a decoding unit (10) for decoding an encoded data stream ES corresponding to a sequence of encoded pictures. In the MPEG standard, three types of pictures are considered: I (or intra) pictures, encoded without any reference to other pictures, P (or predicted) pictures, encoded with reference to a past picture (I or P), and B (or bidirectionally predicted) pictures, encoded with reference to a past and a future picture (I or P) in a display order. These I and P pictures will be hereinafter referred to as reference pictures. Moreover, each picture of an MPEG sequence is subdivided into motion compensation areas called macroblocks.

The decoding unit according to the prior art includes:
a parser (12), for analysing the encoded data stream,
a macroblock processing unit MBPU (13), for computing motion vectors V(n) and variable length decoded data,
an inverse quantizing and inverse discrete cosine transform IQ/IDCT circuit (15) for delivering a residual error data R'(n) from the variable length decoded data,
a motion compensation circuit MC (14) for delivering motion compensated data using the motion vector V(n),
a reconstruction circuit REC (16) for reconstructing pictures from a sum of motion compensated data and residual error data.

The known video decoder comprises an external memory EMEM (1) for storing reconstructed pictures delivered by the reconstruction circuit. The pictures to be stored are reference pictures F0 and F1 of the intra or predictive type.

The decoding unit further comprises a memory controller MMI (11) for controlling data exchange between said decoding unit and the external memory via a data bus (2). Said data exchange is, for example, the storage of reference pictures from the reconstruction circuit into the external memory, or the read-out from the external memory of the motion compensated data in a reference picture in order to fetch them to the motion compensation circuit.

A first drawback of the prior art is that the motion compensation is performed on a macroblock basis, so that the motion compensated data are generally read out from different zones of the external memory for successive macroblocks. As a consequence, the data read-out from the external memory is achieved in an irregular manner and a video decoder according to the prior art needs an important memory bandwidth due to the amount of data to be read and to the difficulty of optimizing the access to the external memory with the memory controller. In effect, the data to be read are not necessary aligned in the memory data banks. This drawback is strengthened by the fact that the bandwidth resources do not increase as fast as processor frequency does according to Moore's law.

The following example illustrates this point in the case of an MPEG-2 decoding. Let us assume an external memory organized in words of 64 bits. A word can then contain 8 values (luminance or chrominance) of pixels. The motion compensation circuit has to read areas of at least 16×8 pixels. In MPEG2 standard, the motion compensation has a half-pixel accuracy. As a consequence, the motion compensation unit has to read an area of 17×9 pixels in order to compute the interpolated pixel values. Due to the memory organization in words, the motion compensation circuit reads in fact 3 words of 9 lines or in other words 24×9 bytes, corresponding to a loss of bandwidth of 30% (17×9 corresponds to a bandwidth of approximately 180 Mbytes/s and 24×9 corresponds to a bandwidth of approximately 270 Mbytes/s for a MPEG-2 High Definition HD picture).

Another problem relates to the optimization of the memory controller. This is due to the fact that external memory, such as SDRAM for example, operates in a burst mode, which is not adapted to an irregular read-out of data. Bursts are generated for each lines of the memory. A burst comprises at least 7 or 8 cycles, whereas 3 cycles, in our example, would have been enough to read out the 3 words of a line. As a consequence, the needed bandwidth required for a video decoder according to the prior art is more than twice the bandwidth that would have theoretically been necessary for the decoding process.

Moreover, reference pictures cannot be stored easily in embedded memories instead of the external memory, as said memories are still very expensive. In our example, an embedded memory of 6 Mbytes would be necessary in a high definition HD format, such a memory corresponding to a circuit of approximately 50 mm² size in a CMOS 0.12 micron technology, which represents a too important circuit surface.

SUMMARY OF THE INVENTION

It is an object of the invention to propose a video processing device that requires a lower memory bandwidth than those of the prior art.

To this end, the video processing device in accordance with the invention comprises:
a processing unit including a reconstruction circuit for reconstructing pictures from decoded data,
an external memory for storing the reconstructed pictures delivered by the reconstruction circuit, the processing unit further comprising:
a memory controller for controlling data exchange between the processing unit and the external memory,
a cache memory for temporarily storing data corresponding to a prediction area, said data being read out from the external memory via the memory controller, and
a motion compensation circuit for delivering motion compensated data to the reconstruction circuit on the basis of the prediction area read out from the cache memory.

The present invention is based on the fact that, during the decompression process, the processing unit needs to read recursively a predetermined zone of the external memory corresponding to a predetermined area of a reference picture, said predetermination area being hereinafter referred to as prediction area. Said prediction area serves as a reference for reconstructing a current picture block per block.

Such a prediction area can be loaded into an embedded memory, i.e. a cache memory, without requiring prohibitive cost or circuit surface, as said area is much smaller than the whole picture.

As a result, the memory bandwidth required by a processing device in accordance with the invention is decreased compared to a solution without cache memory.

Moreover, there is no loss of bandwidth at the memory controller level, as the read-out of data from the external memory into the cache memory is achieved on a regular basis.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention is here described by way of examples of a video decoder and a video encoder but it will obvious to a person skilled in the art that said invention is applicable to any video processing device for processing data corresponding to a sequence of pictures according to a predictive block-based encoding technique, such as a transcoder for transcoding a first encoded data stream corresponding to a sequence of encoded pictures into a second encoded data stream, or a device for performing video scaling.

It is described in the case of the MPEG2 standard but is also applicable to other encoding format in which the prediction area has a limited format such as, for example, H.264.

The present invention is also based on the fact that the size of the prediction area in which the 17×9 pixel area (as it has been hereinabove defined) has to be found is predetermined. In the example of the MPEG2 standard, the prediction area is limited to 256 lines for decoding.

Figure 1:
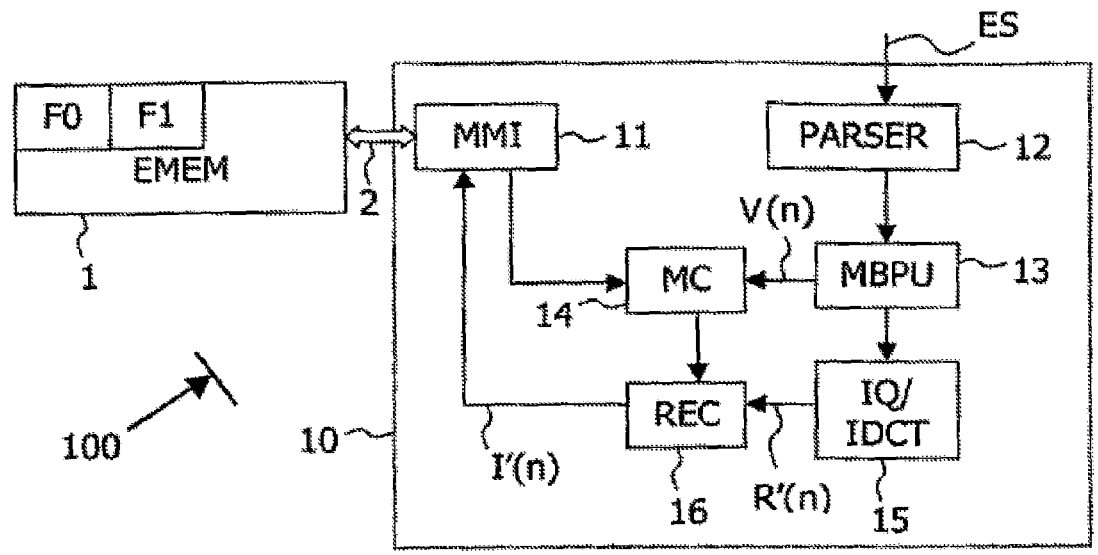
FIG. 1 is a schematic view of a conventional video decoder.
Figure 2:
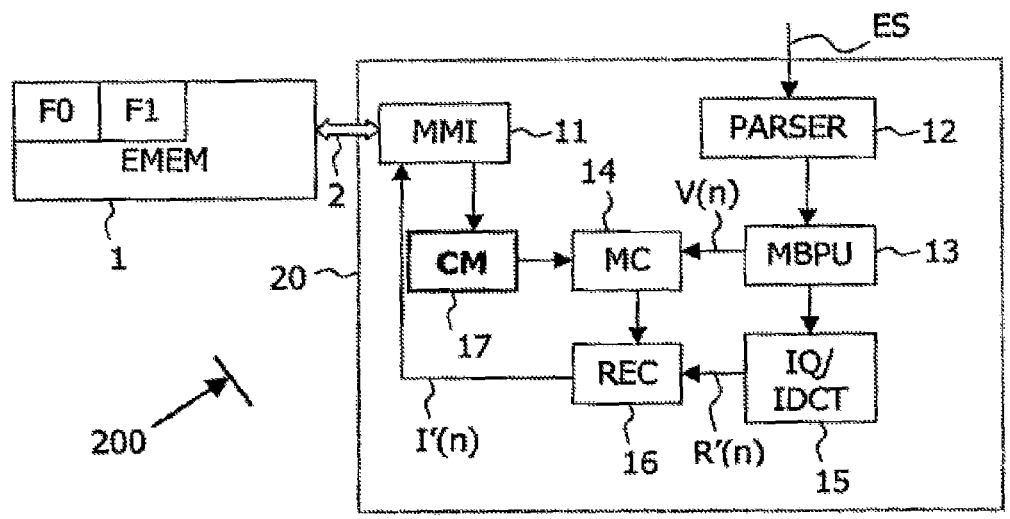
FIG. 2 is a schematic view of a video decoder in accordance with the invention.

FIG. 2 describes a video decoder in accordance with the invention. Said video decoder (200) comprises a decoding unit (20) for decoding an encoded data stream ES corresponding to a sequence of encoded pictures. Said decoding unit includes:
a parser (12), for analyzing the encoded data stream,
a macroblock processing unit MBPU (13), for computing motion vectors V(n) and variable length decoded data,
an inverse quantizing and inverse discrete cosine transform IQ/IDCT circuit (15) for delivering a residual error data R'(n) from the variable length decoded data,
a motion compensation circuit MC (14) for delivering motion compensated data using the motion vector V(n),
a reconstruction circuit REC (16) for reconstructing pictures from a sum of motion compensated data and residual error data.

The video decoder comprises an external memory EMEM (1) for storing reference pictures F0 and F1 delivered by the reconstruction circuit.

The decoding unit also comprises a memory controller MMI (11) for controlling data exchange between said decoding unit and the external memory via a data bus (2).

The video decoder according to the invention further comprises a cache memory CM (17) for temporarily storing data read out from the external memory via the memory controller. Said cache memory comprises, in the MPEG2 case, 256 lines and is adapted to receive the prediction area. The content of the cache memory can be updated in different ways.

According to a first way, the data corresponding to the prediction area are read out from the external memory in a regular manner during the decoding process. The content of the cache memory is changed row by row, each time a row of macroblocks has been processed. Motion compensation is then performed directly using the content of said cache memory, the irregular read-out of data being done at the level of the cache memory and no more at the level of the external memory, thus without requiring additional memory bandwidth. As a result, the bandwidth required by a decoding device according to the invention is fixed and is equal to about 180 Mbytes/s.

According to another way, the 256 lines of the cache memory are divided into equal zones. If the decoding unit needs to access a specific pixel in a zone, then a request, e.g. a cache miss, is generated by the cache memory, and it is only in that case that the corresponding zone is fetched from the external memory to the cache memory thanks to the memory controller. So, if during decoding, no pixel from a zone is needed, the bandwidth to fetch the corresponding part of the picture is saved. As a result, the bandwidth required by the decoding device according to the invention is variable and is comprised between 0 and 180 MByte/s, depending on the decoded stream.

According to a first embodiment of the invention, the prediction areas of 2 reference pictures are stored in the cache memory. The size of the embedded memory is thus divided by more than 4 in HD format compared to a solution where the whole frames would have been embedded.

According to a second embodiment of the invention, only the prediction area of the past reference picture is stored in the cache memory, whereas the future reference picture is read out from the external memory. In this case, the embedded memory size is decreased but the memory bandwidth required by a video decoder in accordance with the invention is slightly increased compared to the first embodiment.

According to a third embodiment of the invention, the prediction areas of the luminance component of the reference pictures are stored in the cache memory, whereas the prediction areas of the chrominance component of said reference pictures is read out directly from the external memory. In the same manner, the embedded memory size is decreased but the bandwidth required by the video decoder is slightly increased compared to the first embodiment.

Figure 3:
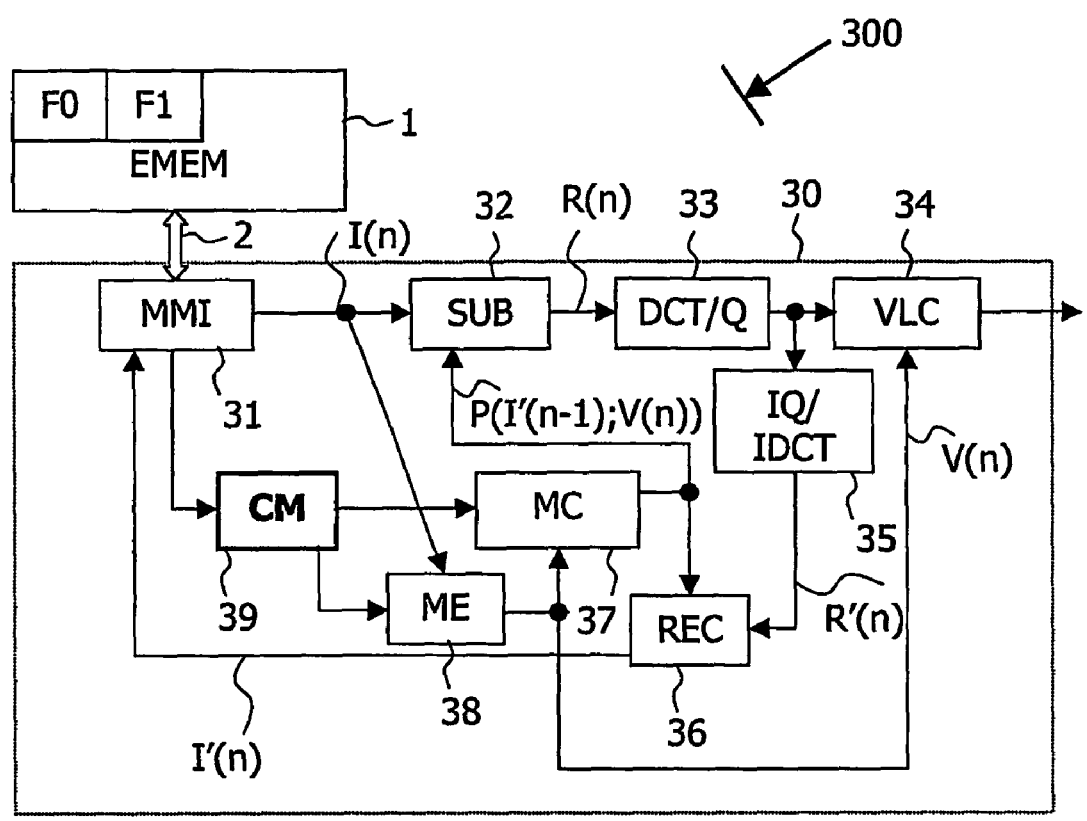
FIG. 3 is a schematic view of a video decoder in accordance with the invention

The present invention is also applicable to a video encoder. FIG. 3 describes a video encoder according to the invention. Said video encoder (300) comprises an encoding unit (30) for encoding an input data stream corresponding to a sequence of pictures. Said encoding unit includes:
a subtractor SUB (32) for delivering first residual error data R(n),
a discrete cosine transform and quantizing DCT/Q circuit (33) for transforming and quantizing successively the first residual error data R(n),
a variable length coder VLC (34) for delivering variable length coded data from the quantized data, an inverse quantizing and inverse discrete cosine transform IQ/IDCT circuit (35) for delivering second residual error data R'(n) from the quantized data, a motion compensation circuit MC (37) for delivering motion compensated data P(I'(n−1); V(n)) to a reconstruction circuit REC (36) and to the subtractor using a motion vector V(n), the subtractor being adapted to subtract the motion compensated data from the input data I(n), a reconstruction circuit REC (36) for reconstructing pictures from a sum of the motion compensated data and the second residual error data R', a motion estimation circuit ME (38) for finding, in a reference picture, a reference macroblock associated to the current macroblock to be encoded, as well as its corresponding motion vector V(n).

The motion estimation circuit is based, for example, on the computing of the sum of absolute differences SAD, the expression of the SAD being:

$$SAD = \sum_{i=0}^{k \cdot k - 1} |A(i) - B(i)|$$

where B(i) and A(i) respectively designate the current macroblock of size k×k (16×16 pixels for example in the MPEG-2 standard) and the reference macroblock in the reference picture. The reference macroblock that minimizes the SAD is considered as the best matching macroblock and the corresponding data and motion vector are derived.

The video decoder comprises an external memory EMEM (1) for storing reference pictures F0 and F1 delivered by the reconstruction circuit, as well as the current picture to be encoded.

The encoding unit comprises a memory controller MMI (31) for controlling data exchange between said encoding unit and the external memory via a data bus (2).

The video decoder according to the invention further comprises a cache memory CM (39) for temporarily storing data corresponding to the prediction area and read out from the external memory via the memory controller. Motion estimation and motion compensation are then performed directly using said cache memory In the case of a video encoder, the gain in terms of bandwidth can even be increased compared to a video decoder, as the size of the prediction area is not normative for encoding and thus can be decreased to 128 lines or even 64 lines but, of course, at the cost of a decreased video quality.

The drawings and their description hereinbefore illustrate rather than limit the invention. It will be evident that there are numerous alternatives, which fall within the scope of the appended claims. In this respect, the following closing remarks are made.

There are numerous ways of implementing functions by means of items of hardware. In this respect, the drawings are very diagrammatic, each representing only one possible embodiment of the invention. Thus, although a drawing shows different functions as different blocks, this by no means excludes that a single item of hardware carries out several functions. Nor does it exclude that an assembly of items of hardware carries out a function.

Any reference sign in the following claims should not be construed as limiting the claim. It will be obvious that the use of the verb "to comprise" and its conjugations do not exclude the presence of any other steps or elements besides those defined in any claim. The word "a" or "an" preceding an element or step does not exclude the presence of a plurality of such elements or steps.

The invention claimed is:

1. A video processing device for processing data corresponding to a sequence of pictures according to a predictive block-based encoding technique, said device comprising:
a processing unit including a reconstruction circuit for reconstructing pictures from decoded data,
an external memory for storing reference pictures delivered by the processing unit,
the processing unit further comprising:
a memory controller for controlling data exchange between the processing unit and the external memory,
a cache memory for temporarily storing data corresponding to a prediction area, said data being read out from the external memory via the memory controller, and
a motion compensation circuit for delivering motion compensated data to the reconstruction circuit on the basis of the prediction area read out from the cache memory;
said device being configured to:
divide the data corresponding to the prediction area within the cache memory into zones of equal size;
determine a subset of the zones that contain pixels corresponding to an image to be retrieved, and
retrieve, during decoding, only the subset from the external memory to the cache memory;
wherein bandwidth required to retrieve the image is reduced as a function of a quantity of the zones that are not retrieved based on failure to contain the corresponding pixels.

2. A video processing device as claimed in claim 1, wherein the processing unit is a decoding unit for decoding an encoded data stream corresponding to a sequence of encoded pictures.

3. A video processing device as claimed in claim 1, wherein the processing unit is an encoding unit for encoding an input data stream corresponding to a sequence of pictures.

4. A video processing device as claimed in claim 1, wherein the processing unit is a transcoding unit for transcoding a first encoded data stream corresponding to a sequence of encoded pictures into a second encoded data stream.

5. A video processing device as claimed in claim 1, wherein the memory controller is able to fetch automatically the data corresponding to a complete prediction area from the external memory to the cache memory.

6. A video processing device as claimed in claim 5, wherein the memory controller is able to fetch data corresponding to a zone from the external memory to the cache memory upon request of the processing unit.

7. A video processing device as claimed in claim 6, wherein the cache memory is adapted to receive the prediction areas of two reference pictures.

8. A video processing device as claimed in claim 7, wherein the cache memory is adapted to receive the prediction area of a past reference picture, the prediction area of a future reference picture being read out from the external memory.

9. A video processing device as claimed in claim 8, wherein the cache memory is adapted to receive luminance components of the prediction area of at least one reference picture.

10. A video processing device as claimed in claim 1, wherein the cache memory is divided into equal zones, and the memory controller is able to fetch data corresponding to a zone from the external memory to the cache memory upon request of the processing unit.

11. A video processing device as claimed in claim 1, wherein the cache memory is adapted to receive the prediction areas of two reference pictures.

12. A video processing device as claimed in claim 1, wherein the cache memory is adapted to receive the prediction area of a past reference picture, the prediction area of a future reference picture being read out from the external memory.

13. A video processing device as claimed in claim 1, wherein the cache memory is adapted to receive luminance components of the prediction area of at least one reference picture.

14. A video processing method for processing data corresponding to a sequence of pictures according to a predictive block-based encoding technique, said method comprising the steps of:
- reconstructing pictures from decoded data;
- storing reference pictures delivered by the reconstruction step in an external memory;
- temporarily storing data corresponding to a prediction area in a cache memory, said data being read out from the external memory via a memory controller;
- dividing the data corresponding to the prediction area within the cache memory into zones of equal size;
- determining a subset of the zones that contain pixels corresponding to an image to be retrieved, and
- retrieving only the subset from the external memory to the cache memory; and
- performing motion compensation, including delivery of motion compensated data to the reconstruction step on the basis of the prediction area read out from the cache memory;
- wherein bandwidth required to retrieve the image is reduced as a function of a quantity of the zones that are not retrieved based on failure to contain the corresponding pixels.

* * * * *